United States Patent
Kuang

(10) Patent No.: US 10,494,294 B2
(45) Date of Patent: *Dec. 3, 2019

(54) OPTICAL GLASS AND OPTICAL ELEMENT

(71) Applicant: CDGM Glass Co., Ltd., Chengdu, Sichuan (CN)

(72) Inventor: Bo Kuang, Sichuan (CN)

(73) Assignee: CDGM Glass Co., Ltd., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/080,845

(22) PCT Filed: Nov. 22, 2016

(86) PCT No.: PCT/CN2016/106786
§ 371 (c)(1),
(2) Date: Aug. 29, 2018

(87) PCT Pub. No.: WO2017/152656
PCT Pub. Date: Sep. 14, 2017

(65) Prior Publication Data
US 2019/0062199 A1 Feb. 28, 2019

(30) Foreign Application Priority Data

Mar. 7, 2016 (CN) .......................... 2016 1 0128729
Mar. 7, 2016 (CN) .......................... 2016 1 0128861

(51) Int. Cl.
*C03C 3/155* (2006.01)
*C03C 3/068* (2006.01)
*C03C 3/15* (2006.01)

(52) U.S. Cl.
CPC .............. *C03C 3/155* (2013.01); *C03C 3/068* (2013.01); *C03C 3/15* (2013.01)

(58) Field of Classification Search
CPC ........... C03C 3/064; C03C 3/068; C03C 3/15; C03C 3/155
See application file for complete search history.

(56) References Cited

U.S. PATENT DOCUMENTS

| 8,778,821 | B2 * | 7/2014 | Sun | .......................... C03C 3/066 501/78 |
| 2010/0255979 | A1 * | 10/2010 | Fujiwara | .................. C03C 3/068 501/51 |
| 2013/0190162 | A1 * | 7/2013 | Sun | .......................... C03C 3/068 501/78 |
| 2019/0031556 | A1 * | 1/2019 | Kuang | .................... C03C 3/068 |

FOREIGN PATENT DOCUMENTS

| CN | 101805120 A | 8/2010 |
| CN | 102923952 A | 2/2013 |
| CN | 105645760 A | 6/2016 |
| CN | 105645766 A | 6/2016 |
| EP | 1236694 A1 | 9/2002 |

OTHER PUBLICATIONS

International Search Report for PCT/CN2016/106786 dated Feb. 28, 2017.

* cited by examiner

*Primary Examiner* — Elizabeth A. Bolden
(74) *Attorney, Agent, or Firm* — Caesar Rivise, PC

(57) ABSTRACT

The invention provides a high-refraction low-dispersion optical glass with refractive index of 1.76-1.80 and Abbe number of 47-51. The optical glass, comprising the following components by weight percentage: 0-3% of $SiO_2$; 25-40% of $B_2O_3$; 20-40% of $La_2O_3$; 12-25% of $Gd_2O_3$; 6.5-15% of $ZrO_2$; greater than 10% but less than or equal to 20% of ZnO; 0-5% of $Ta_2O_5$; 0-5% of $Nb_2O_5$; 0-10% of $Li_2O$; less than 0.45 of $(Ta_2O_5+Nb_2O_5)/(ZnO+Li_2O)$; 0-10% of $Y_2O_3$; and below 625° C. of glass transition temperature Tg. With reasonable component ratio, the high-refraction low-dispersion optical glass favorable to precision molding with excellent transmittance can be easily enabled while realizing the required optical constant of the glass of the present invention.

13 Claims, No Drawings

OPTICAL GLASS AND OPTICAL ELEMENT

CROSS REFERENCE TO RELATED APPLICATIONS

This United States national phase application claims benefit under 35 U.S.C. § 371 of PCT Application No. PCT/CN2016/106786 filed on Nov. 22, 2016, which in turn claims benefit under Chinese Application Serial No. 201610128729.6 filed on Mar. 7, 2016 and Chinese Application Serial No. 201610128861.7 filed on Mar. 7, 2016 and all of whose entire disclosures are incorporated by reference herein

TECHNICAL FIELD

The invention relates to an optical glass with high-refraction low-dispersion, and a glass preform and an optical element made of the above optical glass.

BACKGROUND OF THE INVENTION

For optical glass, refractive index, Abbe number and transmittance are its core optic characters. The refractive index and Abbe number decide the basic functions of glass, and the optical glass with the refractive index of 1.76-1.80 and Abbe number of 47-51 is a high-refraction low-dispersion optical glass. The application of such high performance glass in an optical system can shorten the length of lens and improve the imaging quality.

In order to meet the requirements of precision molding of optical glass, the transition temperature Tg of optical glass is required. Under the premise of realizing the same optical performance, how to realize low Tg temperature of glass and guarantee excellent transmittance is the objective of research and development at present. CN102050571A discloses a high refractive index optical glass with a refractive index of 1.77-1.83 and Abbe number of 44-51, but its Tg temperature is higher, so it is not suitable for low-cost precision molding. In addition, the glass contains a lot of $Ta_2O_5$, while $Ta_2O_5$ belongs to an expensive metal oxide, and intensive use may increase the material cost of the high-refraction low-dispersion optical glass and reduce the product economy. Additionally, it further contains $SnO_2$, which is not only difficult to melt, easy to form impurities in glass, and affect the inherent quality and processing performance of glass, but also can improve the pigmentation degree of glass, reduce the transmittance. The optical element of the optical system for camera shooting or projecting has higher requirements for the transmittance of optical glass, and the transmission light of the optical system will be affected if the transmission light of the lens formed by high-refraction low-dispersion optical glass is not enough, thus influencing the imaging quality.

BRIEF SUMMARY OF THE INVENTION

The technical problem to be solved by the present invention is to provide a high-refraction low-dispersion optical glass with refractive index of 1.76-1.80 and Abbe number of 47-51. The glass has an excellent transmittance when the content of $Ta_2O_5$ in glass component is reduced.

The present invention also provides a glass preform and an optical element made of the above optical glass.

The technical scheme to solve the technical problem in the present invention is: an optical glass, comprising the following components by weight percentage: 0-3% of $SiO_2$; 25-40% of $B_2O_3$; 20-40% of $La_2O_3$; 12-25% of $Gd_2O_3$; 6.5-15% of $ZrO_2$; greater than 10% but less than or equal to 20% of ZnO; 0-5% of $Ta_2O_5$; 0-5% of $Nb_2O_5$; 0-10% of $Li_2O$; less than 0.45 of $(Ta_2O_5+Nb_2O_5)/(ZnO+Li_2O)$; 0-10% of $Y_2O_3$; and below 625° C. of glass transition temperature Tg.

Further, it comprises 0-10% of $GeO_2$; 0-10% of $Bi_2O_3$; 0-10% of $Al_2O_3$; 0-10% of $Na_2O$; 0-10% of $K_2O$; 0-1% of $CeO_2$; 0-1% of $Sb_2O_3$; 0-10% of RO, in which RO is one or more of MgO, CaO, SrO or BaO.

Further, it comprises 0-5% of $Al_2O_3$ and/or 0-5% of $Na_2O$ and/or 0-5% of $K_2O$ and/or 0-5% of $GeO_2$ and/or 0-5% of $Bi_2O_3$ and/or 0-0.5% of $CeO_2$ and/or 0-0.5% of $Sb_2O_3$ and/or 0-5% of RO.

Further, it comprises 0-1% of $Al_2O_3$ and/or 0-1% of $Na_2O$ and/or 0-1% of $K_2O$ and/or 0-1% of $GeO_2$ and/or 0-1% of $Bi_2O_3$ and/or 0-1% of RO.

Further, $(ZrO_2+Y_2O_3)/(Nb_2O_5+Gd_2O_3)$ is 0.30-1.50; $La_2O_3/(La_2O_3+Gd_2O_3+Y_2O_3)$ is 0.38-0.75; $ZnO/(B_2O_3+SiO_2)$ is 0.25-0.65.

Further, it comprises 28.5-35% of $B_2O_3$ and/or 25-35% of $La_2O_3$ and/or 14-22% of $Gd_2O_3$ and/or 6.5-10% of $ZrO_2$ and/or 11-16% of ZnO and/or 0-1% of $SiO_2$ and/or 0-1% of $Ta_2O_5$ and/or 0-1% of $Nb_2O_5$ and/or 0-7% of $Y_2O_3$ and/or 0-5% of $Li_2O$.

Further, it comprises 29-32% of $B_2O_3$ and/or 27-32% of $La_2O_3$ and/or 15-20% of $Gd_2O_3$ and/or 6.5-8.5% of $ZrO_2$ and/or 11-14.5% of ZnO and/or 0-0.5% of $SiO_2$ and/or 0-0.5% of $Ta_2O_5$ and/or 0-0.5% of $Nb_2O_5$ and/or 0.1-5% of $Y_2O_3$ and/or 0-1% of $Li_2O$.

Further, $(Ta_2O_5+Nb_2O_5)/(ZnO+Li_2O)$ is less than 0.10, and/or $La_2O_3/(La_2O_3+Gd_2O_3+Y_2O_3)$ is 0.45-0.70, and/or $ZnO/(B_2O_3+SiO_2)$ is 0.30-0.55, and/or $(ZrO_2+Y_2O_3)/(Nb_2O_5+Gd_2O_3)$ is 0.48-1.10.

Further, $(Ta_2O_5+Nb_2O_5)/(ZnO+Li_2O)$ is less than 0.07, and/or $La_2O_3/(La_2O_3+Gd_2O_3+Y_2O_3)$ is 0.55-0.65, and/or $ZnO/(B_2O_3+SiO_2)$ is 0.30-0.50, and/or $(ZrO_2+Y_2O_3)/(Nb_2O_5+Gd_2O_3)$ is 0.50-1.0.

Further, of glass the refractive index is 1.76-1.80, the Abbe number is 47-51 and the density is below 5.00 g/cm³.

A glass preform is made of the above optical glass.

An optical element is made of the above optical glass.

The beneficial effects of the present invention are that the transmittance of glass becomes excellent without introducing $SnO_2$, the product cost is optimized by reducing the content of $Ta_2O_5$, and that with reasonable component ratio, the high-refraction low-dispersion optical glass in favor of precision molding and with excellent transmittance, as well as the glass preform and optical element made of the optical glass can be easily enabled while realizing the required optical constant of the glass.

DETAILED DESCRIPTION OF THE INVENTION

I. Optical Glass

The composition of the optical glass in the present invention will be described in detail below, the content and total content of each glass component is expressed by wt % unless otherwise specified, and the ratio of content to total content of glass component is expressed by weight ratio. In addition, in the following description, if referred to below or above the prescribed value, the prescribed value is included.

$B_2O_3$ is a glass network forming component having effects of improving glass meltability and reducing glass transition temperature. In order to achieve the above-mentioned effect, 25% or more $B_2O_3$ is introduced in the present invention. However, when the introduced amount exceeds 40%, the glass stability will be lowered, so will the refractive index, such that the high refractive index of the present invention cannot be obtained. Therefore, the content of $B_2O_3$ in the present invention is 25-40%, preferably 28.5-35%, and more preferably 29-32%.

$SiO_2$ is also a glass forming body, which is different from the loose chain layered network formed by $B_2O_3$. $SiO_2$ forms silica-oxygen tetrahedron three-dimensional network in the glass, being very dense and solid. This network is added into the glass to reinforce the loose boron oxide triangular body [$BO_3$] network to make it dense, thereby enhancing the high temperature viscosity of the glass. At the same time, the addition of the silica-oxygen tetrahedron three-dimensional network and the improved capability of glass network isolating devitrification cations and anions such as $La_2O_3$, $Nb_2O_5$ increase the devitrification threshold, so that the anti-devitrification property of the glass is improved. However, if the content of $SiO_2$ is increased without limitation, difficulties in dissolution will arise. On the other hand, the content of rare earth oxides including $La_2O_3$ and $Gd_2O_3$ will be increased inevitably to main high refractive index and low dispersion, while the solubility of $SiO_2$ to $La_2O_3$ is relatively low, thus resulting in sharp drop of devitrification resistance of glass. Therefore, the content of $SiO_2$ in the present invention is confined to 0-3%, preferably 0-1%, and further preferably 0-0.5%.

$La_2O_3$ is an essential component for obtaining the optical properties required for the present invention. When the content of $La_2O_3$ is less than 20%, it is difficult to achieve the required optical properties; but when the content exceeds 40%, the devitrification resistance and melting property of glass will deteriorate. Therefore, the range of the content of $La_2O_3$ in the present invention is 20-40%, preferably 25-35%, and more preferably 27-32%.

$Gd_2O_3$ is an effective component to obtain an optical glass of high refractive index. The stability of glass can be improved through the coexistence of $Gd_2O_3$ and $La_2O_3$ in the present invention, but the above effect will not be obvious when the content of $Gd_2O_3$ is lower than 12%; when such content exceeds 25%, the devitrification resistance of glass will reduce, and the stability of the glass formed will then be worsened. Therefore, the range of the content of $Gd_2O_3$ in the present invention is 12-25%, preferably 14-22%, and more preferably 15-20%.

$Y_2O_3$ is also preferably introduced into the high-refraction low-dispersion components of the present invention, which can improve the meltability and devitrification resistance of glass and reduce the upper limit of devitrification temperature of glass. However, if its content exceeds 10%, the stability and devitrification resistance of glass will decrease. Therefore, the range of the content of $Y_2O_3$ is 0-10%, preferably 0-7%, and more preferably 0.1-5%.

In $La_2O_3$, $Gd_2O_3$ and $Y_2O_3$, the component with the greatest impact on improving glass refractive index and maintaining glass stability is $La_2O_3$. However, if only $La_2O_3$ is used in the optical glass of the present invention, it is difficult to ensure the sufficient glass stability. Thus, the introduced amount of $La_2O_3$ in the present invention is relatively great, and $La_2O_3$ is made coexist with $Gd_2O_3$; or preferably $La_2O_3$ and $Gd_2O_3$ are made coexist with $Y_2O_3$; the more preferable range of $La_2O_3/(La_2O_3+Gd_2O_3+Y_2O_3)$ is 0.38-0.75, further preferable 0.45-0.70, and furthermore preferable 0.55-0.65, then, the high-refraction low-dispersion glass with excellent stability can be obtained, while the glass is not easy to be colored.

$Nb_2O_5$ has an effect of improving glass refractive index and lowering liquidus temperature, as well as improving the devitrification resistance and chemical durability of glass. If its content exceeds 5%, the dispersion of glass will be improved, and the optical property of the glass in the present invention cannot be obtained. Therefore, the range of the content of $Nb_2O_5$ is 0-5%, preferably 0-1%, more preferably 0-0.5%.

$Ta_2O_5$ can increase the refractive index and does better than $Nb_2O_5$ in maintaining the low dispersion of glass. However, $Ta_2O_5$ is very expensive when compared with other components, hence, its usage is reduced in the present invention from the perspectives of utility and cost. The range of the content of $Ta_2O_5$ in the present invention is 0-5%, preferably 0-1%, more preferably 0-0.5%, and further preferably not introduced.

The appropriate addition of ZnO in glass can improve the chemical stability and reduce the high-temperature viscosity and temperature Tg of glass. However, if excessive ZnO is added, the devitrification resistance of glass will decline, and the relatively low high-temperature viscosity brings challenges to molding. In this glass system, the temperature Tg cannot meet the design requirements, if the content of ZnO is less than 10%. If the content is higher than 20%, the devitrification resistance of glass will decrease and the high-temperature viscosity cannot meet the design requirements. Therefore, the content of ZnO is confined to be greater than 10% but less than or equal to 20%, preferably 10.2-20%, more preferably 11-16%, further preferably 11-14.5%.

In order to obtain an easy-melting glass with a relatively low temperature Tg and good stability, the inventor, through a large number of experimental studies, has found that the stability and temperature Tg of glass can reach the best balance to obtain a product of better quality when the range of $ZnO/(B_2O_3+SiO_2)$ is 0.25-0.65, preferably 0.30-0.55 and further preferably 0.30-0.50.

$ZrO_2$ is a high-refraction oxide, which can significantly improve the refractive index and chemical stability of glass. In the present invention, $ZrO_2$ also plays a role in improving the abnormal dispersion of glass which is favorable to eliminate secondary spectrum in optical design. The aforesaid effect will not be significant if its content is excessively low, while the risks of glass devitrification will be remarkably increased if the content is excessive. Therefore, the content is confined to 6.5-15%, preferably 6.5-10%, and more preferably 6.5-8.5%.

The optical transmittance is a quite important performance index of optical glass. When the range of $(ZrO_2+Y_2O_3)/(Nb_2O_5+Gd_2O_3)$ is controlled at 0.30-1.50, preferably at 0.48-1.10, more preferably at 0.50-1.00, and furthermore preferably at 0.50-0.70, the coloring of glass can be suppressed, and the heat stability and devitrification resistance of glass can be improved, while enabling preferable ranges of refractive index and Abbe number of the present invention.

The introduction of a small amount of $Al_2O_3$ can improve the stability and chemical stability of glass. However, when the content exceeds 10%, a tendency of meltability deterioration and devitrification resistance reduction of glass is shown. Therefore, the content of $Al_2O_3$ in the present invention is 0-10%, preferably 0-5%, more preferably 0-1%, and further preferably not introduced.

The addition of $Li_2O$ into glass component can effectively lower the temperature Tg. But the optical glass with low softening point is usually smelted with platinum or platinum alloy vessels. During high temperature smelting, $Li^+$ in the glass component easily corrodes platinum or platinum alloy vessels, resulting in more platinum-containing foreign matters in the finished glass, leading to a decline in the quality of the glass. On the other hand, when such glass is used for precision molding, the glass element is easy to have a fuzzy surface, because the die is generally coated with carbon-bearing releasing agent, Li in the glass component is easy to have a reaction with carbon in the releasing agent, thereby generating a rough opaque film on the surface of the glass element. Therefore, the content is confined to 0-10%, preferably 0-5%, and more preferably 0-1%.

$Na_2O$ and $K_2O$ are optional components effective in lowering Tg, and if the content thereof is excessive, it is easy to cause increased devitrification temperature and vitrification difficulties, so that the content are confined to 0-10%, more preferably 0-5%, and further preferably 0-1%.

Based on a large number of experimental studies, the inventor has found that the ratio of the total content of $Ta_2O_5+Nb_2O_5$ to the total content of $ZnO+Li_2O$ has a greater impact on the chemical stability and temperature Tg of the glass. When $(Ta_2O_5+Nb_2O_5)/(ZnO+Li_2O)$ exceeds 0.45, Tg will increase significantly, unfavorable to precision molding; when $(Ta_2O_5+Nb_2O_5)/(ZnO+Li_2O)$ is less than 0.10, the chemical stability of the glass will be greatly enhanced and the glass density will be effectively decreased. In this regard, for the glass of the present invention, $(Ta_2O_5+Nb_2O_5)/(ZnO+Li_2O)$ is confined to be less than 0.45, preferably less than 0.10, more preferably less than 0.07, and further preferably less than 0.01.

RO (one or more of MgO, CaO, SrO or BaO) can improve the meltability and adjust the optical property of glass. However, when the content of RO exceeds 10%, the devitrification resistance of glass will be reduced. Therefore, the content of RO in the present invention is 0-10%, more preferably 0-5%, and further preferably 0-1%.

$Bi_2O_3$ can increase the refractive index of glass, but its excessive content will lower the transmittance on the long side of short waves in the visible region and show a tendency of coloring. Therefore, the content of $Bi_2O_3$ provided by the present invention is preferably 0-10%, more preferably 0-5%, further preferably 0-1%, and furthermore preferably not introduced.

$GeO_2$ can effectively improve the stability and devitrification resistance of glass as well. As $GeO_2$ is very expensive, the preferable content of $GeO_2$ then is 0-10%, more preferably 0-5%, further preferably 0-1%, and furthermore preferably not introduced.

The clarification effect of glass can be increased by adding a small amount of $Sb_2O_3$ and $CeO_2$. However, when the content of $Sb_2O_3$ exceeds 1%, the glass will be faced with the risks of lowered devitrification resistance and increased dispersion, and its strong oxidation will promote the deterioration of molding die. Therefore, the preferable addition of $Sb_2O_3$ is 0-1%, more preferably 0-0.5%, and further preferably not added. The role and the proportion of addition of $CeO_2$ are consistent with $Sb_2O$, so its preferable content is 0-1%, more preferably 0-0.5%, and further preferably not added.

F is an ingredient having great effects of improving light refraction and lowering temperature coefficient of a relative refractive index. However, it is served as the optical element difficultly on account that an environmental load problem is caused by volatilization in its production process and a heterogeneous part is formed for its volatilization from a glass surface in a forming temperature area. Furthermore, the ingredient F is not introduced to realize excellent quality of the glass and good optical constant consistency in the present invention.

Hereinafter, the properties of the optical glass provided by the present invention will be described.

[Optical Constant of Optical Glass]

The optical glass provided by the present invention is a high-refraction low-dispersion glass. A lens made of the high-refraction low-dispersion glass is mostly combined with a lens made of high-refraction high-dispersion glass for chromatic aberration correction. The optical glass provided by the present invention has a glass refractive index nd in the range of 1.76-1.80, preferably in the range of 1.76-1.79, more preferably in the range of 1.76-1.78, and further preferably in the range of 1.77-1.78, from the viewpoint of imparting optical properties suitable for its use. The range of the Abbe number $v_d$ of the glass provided by the present invention is in the range of 47-51, preferably in the range of 48-50 and more preferably in the range of 49-50.

[Coloring of Optical Glass]

The short-wave transmission spectrum characteristics of the glass provided by the present invention are represented by pigmentation degree $(\lambda_{80}/\lambda_5)$. $\lambda_{80}$ refers to a wavelength corresponding to a glass transmittance of 80%, and $\lambda_5$ is a wavelength corresponding to a glass transmittance of 5%. The measurement of $\lambda_{80}$ is carried out using a glass having a thickness of 10±0.1 mm  with two opposing planes parallel to each other and optically polished to measure the spectral transmittance in the wavelength region from 280 nm to 700 nm and a wavelength exhibiting 80% of the transmittance. The spectral transmittance or transmittance is an amount indicated by $I_{out}/I_{in}$ in the case where the light of an intensity $I_{in}$ is incident perpendicularly to the above surface of the glass, passes through the glass and emits the light of an intensity $I_{out}$ from a plane, and includes the transmittance of the surface reflection lost on the above surface of the glass. The higher the refractive index of the glass, the greater the surface reflection loss. Thus, a small value of $\lambda_{80}$ means that the glass is colored very little in the high refractive index glass.

For the optical glass of the present invention, $\lambda_{80}$ is less than or equal to 400 nm, preferably less than or equal to 395 nm, more preferably less than or equal to 390 nm, further preferably less than or equal to 385 nm, and furthermore preferably less than or equal to 380 nm. $\lambda_5$ is less than or equal to 300 nm, preferably less than or equal to 290 nm, more preferably less than or equal to 285 nm, further preferably less than or equal to 280 nm.

[Density of Optical Glass]

The density of optical glass is the mass per unit volume at a temperature of 20° C., expressed in $g/cm^3$.

The density of the glass provided by the present invention is below 5.00 $g/cm^3$, preferably below 4.80 $g/cm^3$, more preferably below 4.70 $g/cm^3$, and further preferably below 4.60 $g/cm^3$.

[Transition Temperature of Optical Glass]

The optical glass will gradually turn from a solid state to a plastic state within a certain temperature range. The transition temperature refers to the temperature at which the glass sample is heated from room temperature to sag temperature, corresponding to an intersection between extending lines of linear parts of a low temperature region and a high temperature region.

The transition temperature Tg of the glass provided by the present invention is below 625° C., preferably below 620° C., more preferably below 615° C., and further preferably below 610° C.

II. Optical Preform and Optical Element

Hereinafter, the optical preform and the optical element of the present invention will be described.

The optical preform and the optical element provided by the present invention are both made of the optical glass provided by the present invention described above. The optical preform provided by the present invention has a high refractive index and a low dispersion. The optical element provided by the present invention has a high refractive index and a low dispersion, which can provide such optical elements as various lenses and prisms having a high optical value at a low cost.

Examples of the lens include various lenses with spherical or aspheric surfaces, such as concave meniscus lens, convex meniscus lens, biconvex lens, biconcave lens, planoconvex lens and planoconcave lens.

This lens and a lens made of high-refraction high-dispersion glass are combined to correct the chromatic aberration, suitable as a lens for chromatic aberration correction. In addition, the lens is also effective for the compactness of the optical system.

In addition, for prism, due to the high refractive index, by combining into the optical system and by directing to the desired direction via curved optical path, a compact wide-angle optical system can be realized.

[Optical Glass Embodiment]

The present invention is illustrated by the following embodiments, but shall not be limited to them.

The method of melting and molding optical glass can be carried out by using the technology known to those skilled in the art. Weigh and evenly mix the glass raw materials (carbonate, nitrate, sulfate, hydroxide, oxide, boric acid, etc.) in the proportions of glass oxides, then put into a smelting device (such as platinum crucible), cool to below 1250° C. after appropriate mixing, clarification and homogenization at 1150-1400° C., pour or leak in a molding die, and finally conduct post-processing including annealing, processing, etc., or complete compression molding directly with precision profiling technology.

In addition, the characteristics of glass are measured by following methods, and the results are shown in Tables 1~9.

(1) Refractive Index nd and Abbe Number vd

The refractive index and Abbe number are tested as per the method specified in GB/T7962.1-2010.

(2) Pigmentation Degree of Glass ($\lambda_{80}$, $\lambda_{5}$)

The spectral transmittance is measured by using a glass sample having a thickness of 10±0.1 mm with two opposing planes optically polished, and calculated on the basis of the result.

(3) Transition Temperature of Glass (Tg)

Measurement is made as per the method specified in GB/T7962.16-2010.

(4) Proportion (ρ)

Measurement is made as per the method specified in GB/T7962.20-2010.

TABLE 1

| Composition | Embodiment | | | | | | | | | |
|---|---|---|---|---|---|---|---|---|---|---|
| | 1 | 2 | 3 | 4 | 5 | 6 | 7 | 8 | 9 | 10 |
| $SiO_2$ | 0.14 | 2.84 | 0.82 | 0.20 | 0.67 | 0.51 | 0.75 | 0.36 | 0.48 | 0.87 |
| $B_2O_3$ | 39.57 | 28.51 | 29.04 | 28.9 | 34.22 | 31.08 | 34.16 | 29.15 | 35.68 | 29.03 |
| $La_2O_3$ | 20.33 | 21.73 | 34.36 | 25.12 | 22.14 | 28.12 | 25.03 | 38.85 | 28.16 | 26.14 |
| $Gd_2O_3$ | 14.62 | 12.07 | 13.44 | 21.4 | 15.39 | 16.3 | 18.82 | 13.08 | 15.24 | 12.63 |
| $Y_2O_3$ | 0.17 | 9.85 | 0.53 | 0 | 1.35 | 2.44 | 0 | 0.51 | 0 | 6.52 |
| $Ta_2O_5$ | 0.08 | 4.55 | 0 | 0 | 0.06 | 0 | 0.36 | 0 | 0.11 | 0.84 |
| $Nb_2O_5$ | 4.32 | 0.16 | 0.27 | 0.63 | 0.87 | 0.37 | 0.47 | 0 | 0.34 | 0.26 |
| $ZrO_2$ | 6.52 | 6.72 | 9.71 | 7.11 | 8.36 | 7.24 | 8.33 | 6.74 | 7.64 | 7.66 |
| ZnO | 10.25 | 11.32 | 11.37 | 15.64 | 14.60 | 13.22 | 12.08 | 11.17 | 12.35 | 14.36 |
| $Bi_2O_3$ | 0 | 0.20 | 0 | 0 | 0 | 0 | 0 | 0 | 0 | 0 |
| $GeO_2$ | 0 | 0 | 0 | 0 | 1.10 | 0 | 0 | 0 | 0 | 0 |
| $Al_2O_3$ | 0 | 0.14 | 0 | 0 | 0 | 0 | 0 | 0 | 0 | 0 |
| $Li_2O$ | 0.16 | 0.54 | 0.14 | 0.65 | 0.64 | 0.72 | 0 | 0.14 | 0 | 1.64 |
| $Na_2O$ | 0 | 0 | 0.32 | 0 | 0.21 | 0 | 0 | 0 | 0 | 0 |
| $K_2O$ | 0 | 0 | 0 | 0 | 0.20 | 0 | 0 | 0 | 0 | 0 |
| $Sb_2O_3$ | 0.06 | 0 | 0 | 0 | 0.07 | 0 | 0 | 0 | 0 | 0.05 |
| $CeO_2$ | 0 | 0.03 | 0 | 0 | 0 | 0 | 0 | 0 | 0 | 0 |
| RO | 3.78 | 1.34 | 0 | 0.35 | 0.12 | 0 | 0 | 0 | 0 | 0 |
| Total | 100 | 100 | 100 | 100 | 100 | 100 | 100 | 100 | 100 | 100 |
| $La_2O_3/(La_2O_3 + Gd_2O_3 + Y_2O_3)$ | 0.5789 | 0.4978 | 0.7109 | 0.5400 | 0.5694 | 0.6001 | 0.7408 | 0.5708 | 0.6488 | 0.5772 |
| $(Ta_2O_5 + Nb_2O_5)/(ZnO + Li_2O)$ | 0.4227 | 0.3971 | 0.0235 | 0.0387 | 0.0569 | 0.0265 | 0.0687 | 0 | 0.0364 | 0.0688 |
| $ZnO/(B_2O_3 + SiO_2)$ | 0.2581 | 0.3611 | 0.3808 | 0.5375 | 0.4185 | 0.4185 | 0.3460 | 0.3785 | 0.3415 | 0.4803 |
| $(ZrO_2 + Y_2O_3)/(Nb_2O_5 + Gd_2O_3)$ | 0.3532 | 1.3549 | 0.7469 | 0.3227 | 0.5972 | 0.5807 | 0.4318 | 0.5543 | 0.4904 | 1.1001 |
| nd | 1.76354 | 1.77180 | 1.78343 | 1.78065 | 1.77631 | 1.77416 | 1.77221 | 1.78326 | 1.77545 | 1.77915 |
| vd | 50.86 | 48.25 | 48.93 | 49.31 | 49.52 | 49.51 | 48.36 | 49.35 | 49.28 | 49.66 |
| ρ (g/cm³) | 4.625 | 4.506 | 4.515 | 4.527 | 4.508 | 4.502 | 4.615 | 4.582 | 4.517 | 4.462 |
| $\lambda_{80}/\lambda_{5}$ | 385/286 | 384/285 | 381/282 | 384/285 | 381/280 | 380/280 | 379/280 | 381/284 | 384/282 | 383/281 |
| Tg (° C.) | 623.5 | 620.4 | 618.3 | 609.2 | 614.4 | 614.2 | 617.2 | 615.3 | 614.0 | 613.2 |

TABLE 2

| Composition | Embodiment 11 | 12 | 13 | 14 | 15 | 16 | 17 | 18 | 19 | 20 |
|---|---|---|---|---|---|---|---|---|---|---|
| $SiO_2$ | 0.37 | 0.66 | 0.52 | 0.85 | 1.26 | 1.67 | 2.14 | 1.06 | 0.85 | 0.63 |
| $B_2O_3$ | 36.23 | 29.16 | 30.12 | 33.53 | 31.54 | 32.74 | 29.32 | 37.45 | 32.54 | 37.22 |
| $La_2O_3$ | 22.36 | 34.65 | 24.89 | 23.62 | 29.56 | 21.00 | 26.47 | 21.88 | 24.73 | 23.98 |
| $Gd_2O_3$ | 13.52 | 13.94 | 21.63 | 14.25 | 12.74 | 20.14 | 15.03 | 19.66 | 20.14 | 14.47 |
| $Y_2O_3$ | 1.33 | 0 | 0 | 6.35 | 0 | 0 | 2.45 | 0 | 0 | 3.32 |
| $Ta_2O_5$ | 0.47 | 0 | 0.31 | 0 | 0 | 0.08 | 0 | 0 | 0 | 0 |
| $Nb_2O_5$ | 0.62 | 0 | 0.62 | 0.52 | 0 | 0 | 0.21 | 0 | 0.14 | 0 |
| $ZrO_2$ | 7.26 | 9.24 | 6.95 | 7.33 | 7.26 | 7.05 | 8.11 | 6.92 | 6.88 | 7.58 |
| ZnO | 16.00 | 12.35 | 14.36 | 13.2 | 16.9 | 12.47 | 15.24 | 12.7 | 14.32 | 11.58 |
| $Bi_2O_3$ | 1.30 | 0 | 0 | 0 | 0 | 0 | 0 | 0.33 | 0 | 0 |
| $GeO_2$ | 0.11 | 0 | 0 | 0 | 0 | 0 | 0 | 0 | 0 | 1.00 |
| $Al_2O_3$ | 0 | 0 | 0 | 0 | 0 | 4.85 | 0 | 0 | 0 | 0 |
| $Li_2O$ | 0.36 | 0 | 0.27 | 0.35 | 0.74 | 0 | 0.26 | 0 | 0.26 | 0.22 |
| $Na_2O$ | 0 | 0 | 0 | 0 | 0 | 0 | 0 | 0 | 0.14 | 0 |
| $K_2O$ | 0 | 0 | 0 | 0 | 0 | 0 | 0 | 0 | 0 | 0 |
| $Sb_2O_3$ | 0.07 | 0 | 0 | 0 | 0 | 0 | 0.03 | 0 | 0 | 0 |
| $CeO_2$ | 0 | 0 | 0 | 0 | 0 | 0 | 0 | 0 | 0 | 0 |
| RO | 0 | 0 | 0.33 | 0 | 0 | 0 | 0.74 | 0 | 0 | 0 |
| Total | 100 | 100 | 100 | 100 | 100 | 100 | 100 | 100 | 100 | 100 |
| $La_2O_3/(La_2O_3 + Gd_2O_3 + Y_2O_3)$ | 0.6009 | 0.7131 | 0.5350 | 0.5341 | 0.6988 | 0.5105 | 0.6023 | 0.5267 | 0.5511 | 0.5741 |
| $(Ta_2O_5 + Nb_2O_5)/(ZnO + Li_2O)$ | 0.0613 | 0 | 0.0636 | 0.0384 | 0 | 0.0064 | 0.0135 | 0 | 0.0096 | 0 |
| $ZnO/(B_2O_3 + SiO_2)$ | 0.4372 | 0.4142 | 0.4687 | 0.3839 | 0.5152 | 0.3624 | 0.4844 | 0.3298 | 0.4289 | 0.3059 |
| $(ZrO_2 + Y_2O_3)/(Nb_2O_5 + Gd_2O_3)$ | 0.6075 | 0.6628 | 0.3124 | 0.9262 | 0.5699 | 0.3500 | 0.6929 | 0.3520 | 0.3393 | 0.7533 |
| nd | 1.77034 | 1.77415 | 1.77326 | 1.77185 | 1.78036 | 1.77624 | 1.77241 | 1.76854 | 1.77226 | 1.77471 |
| vd | 49.35 | 49.52 | 49.28 | 48.92 | 48.64 | 49.57 | 49.63 | 49.55 | 49.78 | 49.58 |
| ρ (g/cm³) | 4.526 | 4.582 | 4.563 | 4.522 | 4.515 | 4.637 | 4.567 | 4.528 | 4.495 | 4.521 |
| λ80/λ5 | 3381/281 | 3385/282 | 3382/284 | 3383/282 | 3381/283 | 3380/281 | 3382/280 | 3385/286 | 3386/281 | 387/285 |
| Tg (° C.) | 610.3 | 615.7 | 616.2 | 614.3 | 614.0 | 617.5 | 616.2 | 614.5 | 614.7 | 620.1 |

TABLE 3

| Composition | Embodiment 21 | 22 | 23 | 24 | 25 | 26 | 27 | 28 | 29 | 30 |
|---|---|---|---|---|---|---|---|---|---|---|
| $SiO_2$ | 0.49 | 1.17 | 0.68 | 0.56 | 0.27 | 0.83 | 1.32 | 0.79 | 1.62 | 0.86 |
| $B_2O_3$ | 29.33 | 32.08 | 30.17 | 31.5 | 33.14 | 30.24 | 25.61 | 31.45 | 28.97 | 33.14 |
| $La_2O_3$ | 28.17 | 25.97 | 27.44 | 33.37 | 30.25 | 28.33 | 29.65 | 26.33 | 30.32 | 31.38 |
| $Gd_2O_3$ | 18.24 | 20.16 | 20.76 | 13.32 | 15.27 | 17.86 | 23.44 | 19.16 | 16.32 | 15.32 |
| $Y_2O_3$ | 1.72 | 0 | 2.13 | 0 | 0.85 | 1.22 | 0 | 0 | 0 | 0 |
| $Ta_2O_5$ | 0 | 0 | 0 | 0 | 0.06 | 0 | 0 | 0 | 0 | 0 |
| $Nb_2O_5$ | 0 | 0.04 | 0 | 0 | 0 | 0 | 0 | 0 | 0.25 | 0 |
| $ZrO_2$ | 7.33 | 6.95 | 7.45 | 6.92 | 7.08 | 6.87 | 7.15 | 7.64 | 7.36 | 6.75 |
| ZnO | 12.28 | 13.41 | 11.37 | 14.33 | 12.66 | 13.1 | 12.44 | 13.72 | 11.95 | 12.55 |
| $Bi_2O_3$ | 0 | 0 | 0 | 0 | 0 | 0 | 0 | 0.39 | 0 | 0 |
| $GeO_2$ | 0 | 0 | 0 | 0 | 0 | 0 | 0 | 0 | 0 | 0 |
| $Al_2O_3$ | 0.33 | 0 | 0 | 0 | 0 | 0.42 | 0.52 | 0 | 0.06 | 0.41 |
| $Li_2O$ | 0.35 | 0 | 0 | 0 | 0 | 0 | 0 | 0 | 0 | 0 |
| $Na_2O$ | 0 | 0.22 | 0 | 0 | 0 | 0 | 0 | 0.85 | 0.32 | 0 |
| $K_2O$ | 0 | 0 | 0 | 0 | 0 | 0.27 | 0 | 0 | 0 | 0 |
| $Sb_2O_3$ | 0.24 | 0 | 0 | 0 | 0 | 0 | 0 | 0 | 0 | 0 |
| $CeO_2$ | 0 | 0 | 0 | 0 | 0 | 0.05 | 0 | 0 | 0.18 | 0 |
| RO | 1.52 | 0 | 0 | 0 | 0 | 0.71 | 0 | 0 | 2.30 | 0 |
| Total | 100 | 100 | 100 | 100 | 100 | 100 | 100 | 100 | 100 | 100 |
| $La_2O_3/(La_2O_3 + Gd_2O_3 + Y_2O_3)$ | 0.5853 | 0.5630 | 0.5452 | 0.7147 | 0.6524 | 0.5976 | 0.5585 | 0.5788 | 0.6501 | 0.6719 |
| $(Ta_2O_5 + Nb_2O_5)/(ZnO + Li_2O)$ | 0 | 0.0030 | 0 | 0 | 0.0046 | 0 | 0 | 0 | 0.0202 | 0 |
| $ZnO/(B_2O_3 + SiO_2)$ | 0.4118 | 0.4033 | 0.3686 | 0.4470 | 0.3789 | 0.4216 | 0.4619 | 0.4256 | 0.3907 | 0.3691 |
| $(ZrO_2 + Y_2O_3)/(Nb_2O_5 + Gd_2O_3)$ | 0.4962 | 0.3441 | 0.4615 | 0.5195 | 0.5193 | 0.4530 | 0.3050 | 0.3987 | 0.4442 | 0.4406 |
| nd | 1.77542 | 1.77461 | 1.77682 | 1.77824 | 1.78025 | 1.77492 | 1.76954 | 1.77724 | 1.77452 | 1.77320 |
| vd | 48.95 | 49.22 | 49.62 | 49.37 | 49.52 | 49.55 | 49.75 | 49.19 | 48.95 | 49.37 |
| ρ (g/cm³) | 4.512 | 4.516 | 4.522 | 4.571 | 4.615 | 4.536 | 4.521 | 4.492 | 4.516 | 4.527 |
| λ80/λ5 | 383/285 | 380/281 | 384/285 | 386/283 | 384/281 | 378/280 | 379/280 | 380/279 | 381/282 | 384/282 |
| Tg (° C.) | 615.2 | 617.3 | 616.2 | 614.3 | 614.5 | 615.1 | 614.7 | 613.8 | 617.4 | 614.3 |

TABLE 4

| Composition | Embodiment | | | | | | | | | |
|---|---|---|---|---|---|---|---|---|---|---|
| | 31 | 32 | 33 | 34 | 35 | 36 | 37 | 38 | 39 | 40 |
| $SiO_2$ | 0.74 | 0.68 | 1.06 | 0.92 | 2.15 | 0.81 | 1.22 | 0.69 | 0.88 | 1.17 |
| $B_2O_3$ | 29.36 | 30.25 | 29.34 | 32.95 | 36.37 | 31.25 | 32.24 | 29.37 | 31.09 | 31.02 |
| $La_2O_3$ | 34.33 | 30.17 | 23.37 | 22.47 | 25.11 | 31.35 | 29.31 | 31.25 | 27.76 | 31.27 |
| $Gd_2O_3$ | 15.72 | 18.25 | 20.66 | 13.74 | 16.94 | 18.55 | 17.25 | 16.17 | 19.33 | 16.38 |
| $Y_2O_3$ | 0.93 | 0 | 5.29 | 7.82 | 0.65 | 0 | 0 | 1.54 | 0 | 0 |
| $Ta_2O_5$ | 0 | 0 | 0.31 | 0 | 0 | 0 | 0 | 0.14 | 0 | 0 |
| $Nb_2O_5$ | 0 | 0 | 0 | 0.35 | 0 | 0 | 0 | 0.32 | 0 | 0 |
| $ZrO_2$ | 6.62 | 8.03 | 7.15 | 7.22 | 6.58 | 7.19 | 7.05 | 6.85 | 6.75 | 7.50 |
| ZnO | 12.16 | 12.25 | 11.32 | 13.52 | 12.2 | 10.55 | 12.3 | 13.2 | 13.56 | 11.95 |
| $Bi_2O_3$ | 0 | 0.37 | 0 | 0 | 0 | 0 | 0 | 0 | 0 | 0 |
| $GeO_2$ | 0 | 0 | 0 | 0 | 0 | 0 | 0 | 0 | 0.63 | 0 |
| $Al_2O_3$ | 0 | 0 | 0.13 | 0 | 0 | 0 | 0 | 0.07 | 0 | 0 |
| $Li_2O$ | 0.12 | 0 | 0.07 | 0.57 | 0 | 0.3 | 0.41 | 0.4 | 0 | 0 |
| $Na_2O$ | 0.02 | 0 | 0 | 0 | 0 | 0 | 0 | 0.22 | 0 | 0 |
| $K_2O$ | 0 | 0 | 0 | 0 | 0 | 0 | 0 | 0 | 0 | 0 |
| $Sb_2O_3$ | 0 | 0 | 0.08 | 0 | 0 | 0 | 0 | 0 | 0 | 0 |
| $CeO_2$ | 0 | 0 | 0 | 0 | 0 | 0 | 0 | 0 | 0 | 0 |
| RO | 0 | 0 | 1.22 | 0.44 | 0 | 0 | 0 | 0 | 0 | 0.71 |
| Total | 100 | 100 | 100 | 100 | 100 | 100 | 100 | 100 | 100 | 100 |
| $La_2O_3/(La_2O_3 + Gd_2O_3 + Y_2O_3)$ | 0.6734 | 0.6231 | 0.4738 | 0.5103 | 0.5881 | 0.6283 | 0.6295 | 0.6383 | 0.5895 | 0.6562 |
| $(Ta_2O_5 + Nb_2O_5)/(ZnO + Li_2O)$ | 0 | 0 | 0.0272 | 0.0248 | 0 | 0 | 0 | 0.0338 | 0 | 0 |
| $ZnO/(B_2O_3 + SiO_2)$ | 0.4040 | 0.3961 | 0.3724 | 0.3992 | 0.3167 | 0.3291 | 0.3676 | 0.4391 | 0.4241 | 0.3712 |
| $(ZrO_2 + Y_2O_3)/(Nb_2O_5 + Gd_2O_3)$ | 0.4803 | 0.4400 | 0.6021 | 1.0674 | 0.4268 | 0.3876 | 0.4087 | 0.5088 | 0.3492 | 0.4579 |
| nd | 1.77924 | 1.77514 | 1.77453 | 1.77402 | 1.77456 | 1.77425 | 1.77521 | 1.77762 | 1.77451 | 1.77406 |
| vd | 49.68 | 49.55 | 49.57 | 49.68 | 49.38 | 49.47 | 49.52 | 49.47 | 49.62 | 49.60 |
| $\rho$ (g/cm$^3$) | 4.517 | 4.522 | 4.503 | 4.516 | 4.572 | 4.550 | 4.517 | 4.536 | 4.498 | 4.510 |
| $\lambda 80/\lambda 5$ | 382/281 | 381/281 | 384/282 | 381/283 | 380/281 | 383/281 | 386/284 | 381/280 | 386/285 | 381/281 |
| Tg (° C.) | 614.0 | 615.2 | 615.3 | 614.2 | 614.1 | 615.2 | 614.2 | 616.0 | 614.7 | 614.5 |

TABLE 5

| Composition | Embodiment | | | | | | | | | |
|---|---|---|---|---|---|---|---|---|---|---|
| | 41 | 42 | 43 | 44 | 45 | 46 | 47 | 48 | 49 | 50 |
| $SiO_2$ | 0.29 | 0.64 | 0.72 | 1.05 | 0.82 | 0.93 | 0.38 | 1.85 | 1.08 | 0.52 |
| $B_2O_3$ | 32.15 | 31.52 | 32.7 | 30.16 | 32.50 | 29.47 | 31.29 | 30.66 | 33.51 | 30.74 |
| $La_2O_3$ | 28.33 | 30.48 | 28.10 | 26.33 | 29.07 | 31.26 | 29.32 | 27.91 | 24.06 | 31.03 |
| $Gd_2O_3$ | 19.48 | 17.22 | 16.30 | 18.25 | 16.70 | 18.16 | 18.22 | 13.29 | 20.36 | 15.96 |
| $Y_2O_3$ | 0 | 0 | 0 | 0 | 1.2 | 0 | 0.94 | 4.08 | 0.49 | 2.13 |
| $Ta_2O_5$ | 0 | 0 | 0 | 0 | 0.3 | 0 | 0 | 0 | 0.26 | 0 |
| $Nb_2O_5$ | 0 | 0.06 | 0 | 0.24 | 0.16 | 0 | 0 | 0.21 | 0 | 0 |
| $ZrO_2$ | 7.23 | 6.93 | 6.78 | 7.11 | 7.26 | 6.93 | 6.96 | 7.39 | 6.62 | 7.20 |
| ZnO | 12.34 | 11.88 | 13.65 | 12.25 | 11.85 | 13.05 | 12.55 | 14.03 | 13.39 | 12.42 |
| $Bi_2O_3$ | 0 | 0 | 1.23 | 0 | 0 | 0 | 0 | 0 | 0 | 0 |
| $GeO_2$ | 0 | 0 | 0 | 0 | 0 | 0 | 0.34 | 0 | 0 | 0 |
| $Al_2O_3$ | 0 | 0 | 0.07 | 0 | 0 | 0 | 0 | 0 | 0 | 0 |
| $Li_2O$ | 0.18 | 0 | 0.45 | 0.65 | 0.14 | 0 | 0 | 0.58 | 0.23 | 0 |
| $Na_2O$ | 0 | 0 | 0 | 0.17 | 0 | 0.20 | 0 | 0 | 0 | 0 |
| $K_2O$ | 0 | 0 | 0 | 0 | 0 | 0 | 0 | 0 | 0 | 0 |
| $Sb_2O_3$ | 0 | 0.02 | 0 | 0 | 0 | 0 | 0 | 0 | 0 | 0 |
| $CeO_2$ | 0 | 0 | 0 | 0 | 0 | 0 | 0 | 0 | 0 | 0 |
| RO | 0 | 1.25 | 0 | 3.79 | 0 | 0 | 0 | 0 | 0 | 0 |
| Total | 100 | 100 | 100 | 100 | 100 | 100 | 100 | 100 | 100 | 100 |
| $La_2O_3/(La_2O_3 + Gd_2O_3 + Y_2O_3)$ | 0.5926 | 0.6390 | 0.6329 | 0.5906 | 0.6189 | 0.6325 | 0.6048 | 0.6164 | 0.5357 | 0.6317 |
| $(Ta_2O_5 + Nb_2O_5)/(ZnO + Li_2O)$ | 0 | 0.0051 | 0 | 0.0186 | 0.0384 | 0 | 0 | 0.0144 | 0.0191 | 0 |
| $ZnO/(B_2O_3 + SiO_2)$ | 0.3804 | 0.3694 | 0.4084 | 0.3925 | 0.3556 | 0.4293 | 0.3963 | 0.4316 | 0.3871 | 0.3973 |
| $(ZrO_2 + Y_2O_3)/(Nb_2O_5 + Gd_2O_3)$ | 0.3711 | 0.4010 | 0.4160 | 0.3845 | 0.5018 | 0.3816 | 0.4336 | 0.8496 | 0.3492 | 0.5846 |
| nd | 1.77451 | 1.77462 | 1.77405 | 1.77415 | 1.77416 | 1.77408 | 1.77455 | 1.77426 | 1.77503 | 1.77502 |
| vd | 49.67 | 49.58 | 49.35 | 49.55 | 48.75 | 49.68 | 49.15 | 48.96 | 49.33 | 49.57 |
| $\rho$ (g/cm$^3$) | 4.512 | 4.520 | 4.497 | 4.596 | 4.513 | 4.527 | 4.510 | 4.506 | 4.502 | 4.511 |
| $\lambda 80/\lambda 5$ | 381/284 | 380/280 | 382/280 | 381/283 | 380/279 | 381/282 | 381/281 | 380/282 | 385/284 | 380/279 |
| Tg (° C.) | 608.4 | 612.3 | 614.2 | 615.0 | 612.3 | 614.5 | 613.2 | 611.7 | 615.2 | 617.0 |

TABLE 6

| | Embodiment | | | | | | | | | |
|---|---|---|---|---|---|---|---|---|---|---|
| Composition | 51 | 52 | 53 | 54 | 55 | 56 | 57 | 58 | 59 | 60 |
| $SiO_2$ | 1.03 | 1.21 | 0.92 | 1.74 | 0.66 | 1.18 | 1.25 | 1.83 | 0.62 | 1.05 |
| $B_2O_3$ | 33.25 | 37.55 | 31.22 | 29.61 | 30.72 | 30.98 | 34.09 | 30.59 | 31.47 | 26.58 |
| $La_2O_3$ | 28.64 | 21.64 | 27.66 | 29.04 | 31.33 | 29.47 | 22.33 | 29.34 | 30.19 | 31.5 |
| $Gd_2O_3$ | 15.47 | 17.14 | 18.30 | 19.24 | 15.92 | 17.33 | 17.99 | 18.36 | 16.19 | 17.58 |
| $Y_2O_3$ | 2.36 | 3.35 | 0 | 0 | 0 | 1.38 | 0 | 0.17 | 0 | 0 |
| $Ta_2O_5$ | 0 | 0 | 0 | 0.36 | 0 | 0 | 0 | 0 | 0 | 0.67 |
| $Nb_2O_5$ | 0 | 0.06 | 0 | 0 | 0 | 0 | 0 | 0 | 0 | 0.18 |
| $ZrO_2$ | 6.82 | 6.94 | 7.45 | 6.95 | 6.68 | 7.06 | 8.66 | 7.11 | 6.99 | 7.36 |
| ZnO | 12.06 | 11.85 | 12.75 | 13.06 | 13.36 | 12.15 | 15.2 | 12.49 | 13.65 | 12.62 |
| $Bi_2O_3$ | 0 | 0 | 0 | 0 | 0 | 0 | 0 | 0 | 0.89 | 0 |
| $GeO_2$ | 0 | 0 | 0 | 0 | 0 | 0.45 | 0 | 0 | 0 | 0 |
| $Al_2O_3$ | 0 | 0 | 0 | 0 | 0 | 0 | 0 | 0 | 0 | 0 |
| $Li_2O$ | 0.37 | 0.23 | 0.84 | 0 | 0.66 | 0 | 0.48 | 0.11 | 0 | 0.71 |
| $Na_2O$ | 0 | 0 | 0.32 | 0 | 0 | 0 | 0 | 0 | 0 | 0.32 |
| $K_2O$ | 0 | 0 | 0 | 0 | 0 | 0 | 0 | 0 | 0 | 0 |
| $Sb_2O_3$ | 0 | 0 | 0 | 0 | 0 | 0 | 0 | 0 | 0 | 0.07 |
| $CeO_2$ | 0 | 0.03 | 0 | 0 | 0 | 0 | 0 | 0 | 0 | 0 |
| RO | 0 | 0 | 0.54 | 0 | 0.67 | 0 | 0 | 0 | 0 | 1.36 |
| Total | 100 | 100 | 100 | 100 | 100 | 100 | 100 | 100 | 100 | 100 |
| $La_2O_3/(La_2O_3 + Gd_2O_3 + Y_2O_3)$ | 0.6163 | 0.5136 | 0.6018 | 0.6015 | 0.6631 | 0.6117 | 0.5538 | 0.6129 | 0.6509 | 0.6418 |
| $(Ta_2O_5 + Nb_2O_5)/(ZnO + Li_2O)$ | 0 | 0.0050 | 0 | 0.0276 | 0 | 0 | 0 | 0 | 0 | 0.0638 |
| $ZnO/(B_2O_3 + SiO_2)$ | 0.3518 | 0.3057 | 0.3967 | 0.4166 | 0.4257 | 0.3778 | 0.4301 | 0.3853 | 0.4254 | 0.4567 |
| $(ZrO_2 + Y_2O_3)/(Nb_2O_5 + Gd_2O_3)$ | 0.5934 | 0.5983 | 0.4071 | 0.3612 | 0.4196 | 0.487 | 0.4814 | 0.3965 | 0.4317 | 0.4144 |
| nd | 1.76958 | 1.77236 | 1.77415 | 4.77256 | 1.77422 | 1.77463 | 1.77458 | 1.77452 | 1.77406 | 1.77409 |
| vd | 49.57 | 48.26 | 48.37 | 49.62 | 49.89 | 49.52 | 49.57 | 49.50 | 49.51 | 49.67 |
| ρ (g/cm³) | 4.511 | 4.520 | 4.517 | 4.703 | 4.561 | 4.511 | 4.517 | 4.508 | 4.512 | 4.505 |
| λ80/λ5 | 384/285 | 380/281 | 387/284 | 384/285 | 382/283 | 386/285 | 380/280 | 381/297 | 378/279 | 380/282 |
| Tg (° C.) | 614.2 | 615.1 | 620.3 | 617.5 | 616.2 | 614.3 | 614.7 | 615.0 | 611.8 | 615.2 |

TABLE 7

| | Embodiment | | | | | | | | | |
|---|---|---|---|---|---|---|---|---|---|---|
| Composition | 61 | 62 | 63 | 64 | 65 | 66 | 67 | 68 | 69 | 70 |
| $SiO_2$ | 0.92 | 2.14 | 0.63 | 1.18 | 0.36 | 1.25 | 1.44 | 0.83 | 1.10 | 0.53 |
| $B_2O_3$ | 31.37 | 28.69 | 32.16 | 33.16 | 29.65 | 30.39 | 32.41 | 31.25 | 29.96 | 32.41 |
| $La_2O_3$ | 21.82 | 35.18 | 26.17 | 31.27 | 30.82 | 30.25 | 30.57 | 29.54 | 28.94 | 31.50 |
| $Gd_2O_3$ | 24.00 | 12.36 | 14.47 | 14.15 | 16.3 | 19.30 | 15.25 | 18.3 | 17.36 | 15.51 |
| $Y_2O_3$ | 1.12 | 0.88 | 0 | 1.33 | 3.09 | 0 | 0 | 2.15 | 0 | 0.65 |
| $Ta_2O_5$ | 0 | 0 | 0 | 0 | 0 | 0 | 0.18 | 0 | 0 | 0 |
| $Nb_2O_5$ | 0 | 0.16 | 0 | 0 | 0 | 0 | 0 | 0 | 0 | 0 |
| $ZrO_2$ | 7.36 | 6.59 | 7.09 | 6.68 | 7.15 | 6.94 | 7.54 | 6.78 | 7.22 | 6.88 |
| ZnO | 12.06 | 13.58 | 18.33 | 12.23 | 12.55 | 11.36 | 12.5 | 11.06 | 15.14 | 12.2 |
| $Bi_2O_3$ | 0 | 0 | 0 | 0 | 0 | 0 | 0 | 0 | 0 | 0 |
| $GeO_2$ | 0 | 0 | 0 | 0 | 0 | 0 | 0 | 0 | 0 | 0.32 |
| $Al_2O_3$ | 1.03 | 0 | 0 | 0 | 0 | 0 | 0 | 0 | 0.28 | 0 |
| $Li_2O$ | 0 | 0.42 | 0.92 | 0 | 0.08 | 0.45 | 0 | 0.09 | 0 | 0 |
| $Na_2O$ | 0 | 0 | 0 | 0 | 0 | 0 | 0.11 | 0 | 0 | 0 |
| $K_2O$ | 0.32 | 0 | 0 | 0 | 0 | 0 | 0 | 0 | 0 | 0 |
| $Sb_2O_3$ | 0 | 0 | 0.06 | 0 | 0 | 0 | 0 | 0 | 0 | 0 |
| $CeO_2$ | 0 | 0 | 0 | 0 | 0 | 0 | 0 | 0 | 0 | 0 |
| RO | 0 | 0 | 0.28 | 0 | 0 | 0.06 | 0 | 0 | 0 | 0 |
| Total | 100 | 100 | 100 | 100 | 100 | 100 | 100 | 100 | 100 | 100 |
| $La_2O_3/(La_2O_3 + Gd_2O_3 + Y_2O_3)$ | 0.4648 | 0.7266 | 0.6439 | 0.6689 | 0.6138 | 0.6105 | 0.6672 | 0.5909 | 0.6251 | 0.6609 |
| $(Ta_2O_5 + Nb_2O_5)/(ZnO + Li_2O)$ | 0 | 0.0114 | 0 | 0 | 0 | 0 | 0.0144 | 0 | 0 | 0 |
| $ZnO/(B_2O_3 + SiO_2)$ | 0.3735 | 0.4405 | 0.5609 | 0.3561 | 0.4182 | 0.3590 | 0.3693 | 0.3448 | 0.4874 | 0.3704 |
| $(ZrO_2 + Y_2O_3)/(Nb_2O_5 + Gd_2O_3)$ | 0.3533 | 0.5966 | 0.4900 | 0.5661 | 0.6282 | 0.3596 | 0.4944 | 0.4880 | 0.4159 | 0.4855 |
| nd | 1.77452 | 1.78203 | 1.77458 | 1.77406 | 1.79012 | 1.77415 | 1.77462 | 1.77451 | 1.77405 | 1.76214 |
| vd | 48.95 | 49.52 | 48.36 | 47.59 | 49.57 | 49.68 | 49.57 | 49.52 | 49.50 | 49.37 |
| ρ (g/cm³) | 4.517 | 4.633 | 4.534 | 4.571 | 4.516 | 4.503 | 4.511 | 4.520 | 4.784 | 4.515 |

TABLE 7-continued

| | \multicolumn{10}{c}{Embodiment} |
| Composition | 61 | 62 | 63 | 64 | 65 | 66 | 67 | 68 | 69 | 70 |
|---|---|---|---|---|---|---|---|---|---|---|
| λ80/λ5 | 385/284 | 381/281 | 382/280 | 385/284 | 382/281 | 382/280 | 380/282 | 381/280 | 381/282 | 380/280 |
| Tg (° C.) | 615.2 | 614.8 | 613.3 | 615.0 | 614.7 | 616.2 | 614.5 | 622.0 | 614.2 | 614.5 |

TABLE 8

| | \multicolumn{10}{c}{Embodiment} |
| Composition | 71 | 72 | 73 | 74 | 75 | 76 | 77 | 78 | 79 | 80 |
|---|---|---|---|---|---|---|---|---|---|---|
| $SiO_2$ | 1.26 | 0.92 | 0.75 | 1.35 | 1.18 | 0.78 | 0.59 | 0.69 | 0.84 | 0.37 |
| $B_2O_3$ | 30.33 | 31.25 | 30.41 | 32.39 | 32.85 | 31.05 | 29.64 | 31.04 | 32.33 | 31.2 |
| $La_2O_3$ | 29.34 | 29.15 | 30.3 | 28.44 | 29.14 | 27.94 | 31.36 | 29.66 | 30.94 | 29.04 |
| $Gd_2O_3$ | 16.72 | 16.32 | 17.29 | 16.95 | 15.67 | 16.22 | 19.27 | 18.32 | 18.47 | 17.55 |
| $Y_2O_3$ | 1.64 | 0 | 1.46 | 0 | 0 | 3.62 | 0 | 0.87 | 0 | 0 |
| $Ta_2O_5$ | 0 | 0.47 | 0 | 0 | 0 | 0 | 0 | 0 | 0 | 0.15 |
| $Nb_2O_5$ | 0.33 | 1.22 | 0 | 0 | 0.35 | 0 | 0 | 0 | 0 | 0.24 |
| $ZrO_2$ | 6.95 | 6.84 | 7.09 | 6.99 | 7.18 | 7.58 | 7.39 | 6.59 | 7.2 | 6.91 |
| ZnO | 13.07 | 13.55 | 12.11 | 11.82 | 13.06 | 12.17 | 11.25 | 12.67 | 10.22 | 13.94 |
| $Bi_2O_3$ | 0 | 0 | 0 | 0 | 0 | 0.64 | 0 | 0 | 0 | 0 |
| $GeO_2$ | 0 | 0 | 0.37 | 0 | 0 | 0 | 0 | 0 | 0 | 0 |
| $Al_2O_3$ | 0 | 0 | 0.08 | 0 | 0 | 0 | 0 | 0 | 0 | 0 |
| $Li_2O$ | 0.36 | 0.28 | 0 | 0 | 0.57 | 0 | 0.35 | 0.16 | 0 | 0.34 |
| $Na_2O$ | 0 | 0 | 0.14 | 0 | 0 | 0 | 0.15 | 0 | 0 | 0.26 |
| $K_2O$ | 0 | 0 | 0 | 2.06 | 0 | 0 | 0 | 0 | 0 | 0 |
| $Sb_2O_3$ | 0 | 0 | 0 | 0 | 0 | 0 | 0 | 0 | 0 | 0 |
| $CeO_2$ | 0 | 0 | 0 | 0 | 0 | 0 | 0 | 0 | 0 | 0 |
| RO | 0 | 0 | 0 | 0 | 0 | 0 | 0 | 0 | 0 | 0 |
| Total | 100 | 100 | 100 | 100 | 100 | 100 | 100 | 100 | 100 | 100 |
| $La_2O_3/(La_2O_3 + Gd_2O_3 + Y_2O_3)$ | 0.6151 | 0.6411 | 0.6177 | 0.6266 | 0.6503 | 0.5848 | 0.6194 | 0.6072 | 0.6262 | 0.6233 |
| $(Ta_2O_5 + Nb_2O_5)/(ZnO + Li_2O)$ | 0.0246 | 0.1222 | 0 | 0 | 0.0257 | 0 | 0 | 0 | 0 | 0.0273 |
| $ZnO/(B_2O_3 + SiO_2)$ | 0.4137 | 0.4212 | 0.3886 | 0.3503 | 0.3838 | 0.3823 | 0.3721 | 0.3993 | 0.3081 | 0.4416 |
| $(ZrO_2 + Y_2O_3)/(Nb_2O_5 + Gd_2O_3)$ | 0.5038 | 0.3900 | 0.4945 | 0.4124 | 0.4482 | 0.6905 | 0.3835 | 0.4072 | 0.3898 | 0.3884 |
| nd | 1.77421 | 1.77430 | 1.77458 | 1.77405 | 1.77406 | 1.77400 | 1.77452 | 1.77415 | 1.77452 | 1.77506 |
| vd | 49.51 | 49.60 | 49.55 | 49.72 | 49.39 | 49.42 | 49.50 | 49.51 | 49.22 | 49.50 |
| ρ (g/cm³) | 4.510 | 4.506 | 4.517 | 4.528 | 4.533 | 4.517 | 4.500 | 4.487 | 4.523 | 4.516 |
| λ80/λ5 | 381/280 | 383/282 | 382/282 | 382/281 | 380/281 | 381/279 | 380/282 | 380/284 | 381/280 | 380/280 |
| Tg (° C.) | 614.3 | 614.2 | 614.5 | 615.0 | 614.3 | 614.1 | 615.2 | 614.7 | 614.5 | 613.9 |

TABLE 9

| | \multicolumn{10}{c}{Embodiment} |
| Composition | 81 | 82 | 83 | 84 | 85 | 86 | 87 | 88 | 89 | 90 |
|---|---|---|---|---|---|---|---|---|---|---|
| $SiO_2$ | 0.34 | 0.85 | 0.69 | 1.08 | 0.59 | 0.73 | 0.84 | 0.45 | 0.28 | 0.71 |
| $B_2O_3$ | 33.19 | 31.06 | 29.33 | 30.84 | 34.19 | 35.17 | 32.06 | 31.52 | 30.17 | 32.25 |
| $La_2O_3$ | 28.15 | 31.48 | 31.08 | 29.32 | 26.24 | 25.21 | 29.55 | 30.36 | 29.66 | 30.94 |
| $Gd_2O_3$ | 16.43 | 16.19 | 14.9 | 15.67 | 18.23 | 18.15 | 17.59 | 17.00 | 16.47 | 13.33 |
| $Y_2O_3$ | 1.54 | 0 | 1.75 | 2.08 | 0 | 0.97 | 0 | 0 | 2.16 | 1.68 |
| $Ta_2O_5$ | 0 | 0.12 | 0.37 | 0 | 0 | 0 | 0 | 0 | 0 | 0 |
| $Nb_2O_5$ | 0 | 0 | 0.16 | 0 | 0 | 0.22 | 0 | 0 | 0 | 0 |
| $ZrO_2$ | 7.69 | 6.99 | 7.84 | 7.94 | 6.82 | 7.39 | 7.45 | 7.6 | 6.95 | 7.59 |
| ZnO | 12.30 | 12.06 | 13.25 | 13.07 | 13.47 | 12.04 | 12.6 | 13.07 | 12.26 | 13.50 |
| $Bi_2O_3$ | 0 | 0 | 0 | 0 | 0 | 0 | 0 | 0 | 0 | 0 |
| $GeO_2$ | 0 | 0 | 0 | 0 | 0.35 | 0 | 0 | 0 | 0 | 0 |
| $Al_2O_3$ | 0.36 | 0 | 0 | 0 | 0 | 0 | 0 | 0 | 0.04 | 0 |
| $Li_2O$ | 0 | 0.16 | 0.63 | 0 | 0 | 0.12 | 0 | 0 | 0.95 | 0 |
| $Na_2O$ | 0 | 0.32 | 0 | 0 | 0.11 | 0 | 0 | 0 | 0 | 0 |
| $K_2O$ | 0 | 0 | 0 | 0 | 0 | 0 | 0 | 0 | 0 | 0 |
| $Sb_2O_3$ | 0 | 0.05 | 0 | 0 | 0 | 0 | 0 | 0 | 0 | 0 |

TABLE 9-continued

| Composition | Embodiment | | | | | | | | | |
|---|---|---|---|---|---|---|---|---|---|---|
| | 81 | 82 | 83 | 84 | 85 | 86 | 87 | 88 | 89 | 90 |
| $CeO_2$ | 0 | 0 | 0 | 0 | 0 | 0 | 0 | 0 | 0 | 0 |
| RO | 0 | 0.72 | 0 | 0 | 0 | 0 | 0 | 0 | 1.06 | 0 |
| Total | 100 | 100 | 100 | 100 | 100 | 100 | 100 | 100 | 100 | 100 |
| $La_2O_3/(La_2O_3 + Gd_2O_3 + Y_2O_3)$ | 0.6104 | 0.6604 | 0.6512 | 0.6229 | 0.5901 | 0.5687 | 0.6269 | 0.6410 | 0.6142 | 0.6733 |
| $(Ta_2O_5 + Nb_2O_5)/(ZnO + Li_2O)$ | 0 | 0.0098 | 0.0382 | 0 | 0 | 0.0181 | 0 | 0 | 0 | 0 |
| $ZnO/(B_2O_3 + SiO_2)$ | 0.3668 | 0.3779 | 0.4414 | 0.4095 | 0.3873 | 0.3354 | 0.3830 | 0.4088 | 0.4026 | 0.4096 |
| $(ZrO_2 + Y_2O_3)/(Nb_2O_5 + Gd_2O_3)$ | 0.5618 | 0.4317 | 0.6368 | 0.6394 | 0.3741 | 0.4551 | 0.4235 | 0.4471 | 0.5531 | 0.6954 |
| nd | 1.76592 | 1.77504 | 1.77462 | 1.77406 | 1.78226 | 1.77515 | 1.77463 | 1.77485 | 1.77406 | 1.77428 |
| vd | 49.57 | 49.68 | 49.58 | 49.63 | 49.39 | 49.77 | 49.58 | 49.50 | 49.75 | 49.62 |
| ρ (g/cm³) | 4.506 | 4.517 | 4.603 | 4.557 | 4.532 | 4.526 | 4.521 | 4.503 | 4.518 | 4.509 |
| λ80/λ5 | 382/281 | 380/281 | 382/282 | 380/281 | 380/280 | 381/283 | 380/280 | 382/281 | 379/280 | 380/280 |
| Tg (° C.) | 615.7 | 616.0 | 614.3 | 614.2 | 615.3 | 617.2 | 614.2 | 614.0 | 614.1 | 613.8 |

[Optical Preform Embodiment]

The optical glass obtained from Embodiment 1 in Table 1 is cut into the predetermined size, and the releasing agent is uniformly coated on the surface. Then, the glass is heated, softened and press-molded to produce the preforms of various lenses and prisms, including concave meniscus lens, convex meniscus lens, biconvex lens, biconcave lens, plano-convex lens and planoconcave lens.

[Optical Element Embodiment]

The preforms obtained in the above-mentioned optical preform embodiment are annealed for fine-tuning while the deformation inside the glass is reduced, so that the optical characteristics such as the refractive index are brought to the desired values.

Then, each preform is ground and polished to form a variety of lenses and prisms such as concave meniscus lens, convex meniscus lens, biconvex lens, biconcave lens, plano-convex lens and planoconcave lens. An anti-reflection film may be coated on the surface of the obtained optical element.

The present invention provides a high-refraction low-dispersion optical glass having a low cost and excellent transmittance, with refractive index of 1.76-1.80 and Abbe number of 47-51, and an optical element made of the glass, which can meet the demands of modern novel photoelectric products.

I claim:

1. An optical glass, comprising the following components by weight percentage: 0-3% of $SiO_2$; 25-40% of $B_2O_3$; 20-40% of $La_2O_3$; 12-25% of $Gd_2O_3$; 6.5-15% of $ZrO_2$; greater than 10% but less than or equal to 20% of ZnO; 0-1% of $Ta_2O_5$; 0-5% of $Nb_2O_5$; 0-10% of $Li_2O$; less than 0.45 of $(Ta_2O_5+Nb_2O_5)/(ZnO+Li_2O)$; 0-10% of $Y_2O_3$.

2. The optical glass according to claim 1, further comprising 0-10% of $GeO_2$; 0-10% of $Bi_2O_3$; 0-10% of $Al_2O_3$; 0-10% of $Na_2O$; 0-10% of $K_2O$; 0-1% of $CeO_2$; 0-1% of $Sb_2O_3$; 0-10% of RO, in which RO is one or more of MgO, CaO, SrO or BaO.

3. The optical glass according to claim 2, comprising 0-5% of $Al_2O_3$ and/or 0-5% of $Na_2O$ and/or 0-5% of $K_2O$ and/or 0-5% of $GeO_2$ and/or 0-5% of $Bi_2O_3$ and/or 0-0.5% of $CeO_2$ and/or 0-0.5% of $Sb_2O_3$ and/or 0-5% of RO.

4. The optical glass according to claim 1, wherein the glass refractive index is 1.76-1.80; the Abbe number is 47-51; the density is below 5.00 g/cm³; and the transition temperature Tg is below 625° C.

5. The optical glass according to claim 2, comprising 0-1% of $Al_2O_3$ and/or 0-1% of $Na_2O$ and/or 0-1% of $K_2O$ and/or 0-1% of $GeO_2$ and/or 0-1% of $Bi_2O_3$ and/or 0-1% of RO.

6. The optical glass according to claim 1, comprising 29-32% of $B_2O_3$ and/or 27-32% of $La_2O_3$ and/or 15-20% of $Gd_2O_3$ and/or 6.5-8.5% of $ZrO_2$ and/or 11-14.5% of ZnO and/or 0-0.5% of $SiO_2$ and/or 0-0.5% of $Ta_2O_5$ and/or 0-0.5% of $Nb_2O_5$ and/or 0.1-5% of $Y_2O_3$ and/or 0-1% of $Li_2O$.

7. The optical glass according to claim 1, wherein $(ZrO_2+Y_2O_3)/(Nb_2O_5+Gd_2O_3)$ is 0.30-1.50; $La_2O_3/(La_2O_3+Gd_2O_3+Y_2O_3)$ is 0.38-0.75; $ZnO/(B_2O_3+SiO_2)$ is 0.25-0.65.

8. The optical glass according to claim 1, wherein $(Ta_2O_5+Nb_2O_5)/(ZnO+Li_2O)$ is less than 0.10; and/or $La_2O_3/(La_2O_3+Gd_2O_3+Y_2O_3)$ is 0.45-0.70; and/or $ZnO/(B_2O_3+SiO_2)$ is 0.30-0.55; and/or $(ZrO_2+Y_2O_3)/(Nb_2O_5+Gd_2O_3)$ is 0.48-1.10.

9. The optical glass according to claim 1, comprising 28.5-35% of $B_2O_3$ and/or 25-35% of $La_2O_3$ and/or 14-22% of $Gd_2O_3$ and/or 6.5-10% of $ZrO_2$ and/or 11-16% of ZnO and/or 0-1% of $SiO_2$ and/or 0-1% of $Ta_2O_5$ and/or 0-1% of $Nb_2O_5$ and/or 0-7% of $Y_2O_3$ and/or 0-5% of $Li_2O$.

10. The optical glass according to claim 1, wherein $(Ta_2O_5+Nb_2O_5)/(ZnO+Li_2O)$ is less than 0.07; and/or $La_2O_3/(La_2O_3+Gd_2O_3+Y_2O_3)$ is 0.55-0.65; and/or $ZnO/(B_2O_3+SiO_2)$ is 0.30-0.50; and/or $(ZrO_2+Y_2O_3)/(Nb_2O_5+Gd_2O_3)$ is 0.50-1.0.

11. A glass preform, made of the optical glass according to claim 1.

12. An optical element, made of the optical glass according to claim 1.

13. An optical glass, comprising the following components by weight percentage: 0-3% of $SiO_2$; 25-40% of $B_2O_3$; 20-40% of $La_2O_3$; 12-25% of $Gd_2O_3$; 6.5-15% of $ZrO_2$; greater than 10% but less than or equal to 20% of ZnO; less than 1% of $Ta_2O_5$; 0-5% of $Nb_2O_5$; 0-10% of $Li_2O$; less than 0.45 of $(Ta_2O_5+Nb_2O_5)/(ZnO+Li_2O)$; 0-10% of $Y_2O_3$.

* * * * *